United States Patent [19]
Limburg

[11] 3,941,750
[45] Mar. 2, 1976

[54] POLYVINYLPYRENAL—AN INTRINSIC PHOTOCONDUCTOR AND ACTIVE MATRIX POLYMER

[75] Inventor: William W. Limburg, Penfield, N.Y.

[73] Assignee: Xerox Corporation, Stamford, Conn.

[22] Filed: Sept. 19, 1974

[21] Appl. No.: 507,307

Related U.S. Application Data

[62] Division of Ser. No. 393,082, Aug. 30, 1973, Pat. No. 3,884,689.

[52] U.S. Cl. ............... 260/73 R; 260/67 A; 96/1.5
[51] Int. Cl.² ................ C08G 10/06; G03G 1/68
[58] Field of Search ..................... 260/73 R, 67 A

[56] References Cited
UNITED STATES PATENTS

| | | | |
|---|---|---|---|
| 3,655,378 | 4/1972 | Contois et al. | 260/67 A X |
| 3,718,463 | 2/1973 | Young | 260/73 R X |
| 3,740,218 | 6/1973 | Contois et al. | 260/67 A X |
| 3,776,888 | 12/1973 | Mattor | 260/73 R |
| 3,791,824 | 2/1974 | Bauer et al. | 260/67 R X |
| 3,842,038 | 10/1974 | Lohr et al. | 260/67 A |

*Primary Examiner*—Lucille M. Phynes
*Attorney, Agent, or Firm*—John E. Crowe; James J. Ralabate; James P. O'Sullivan

[57] ABSTRACT

A polyvinylpyrenal copolymer obtained by condensing the corresponding aromatic aldehyde with a copolymer of vinyl alcohol and having a number average molecular weight of at least 5,000. Also included are photoconductive members utilizing such material as an intrinsic photoconductor or as matrix material, demonstrating excellent structural and electronic properties for xerographic purposes.

8 Claims, No Drawings

POLYVINYL PYRENAL-AN INTRINSIC PHOTOCONDUCTOR AND ACTIVE MATRIX POLYMER

CROSS-REFERENCE TO RELATED APPLICATION

This is a divisional of U.S. Pat. No. 3,884,689, granted May 20, 1975.

BACKGROUND OF THE INVENTION

In the electrophotographic or xerographic art it is customary to utilize photoreceptor plates having at least an external photoconductive insulating layer and a charge conductive supporting substrate. Generally, a photoconductive layer is uniformly electrostatically charged in the absence of light or other activating radiation and, thereafter, exposed to a light pattern which can correspond to a negative image. The areas of the photoconductive layer which are so exposed selectively lose their charge much more rapidly than non-exposed areas. As a result, the photoconductive layer at least temporarily retains a charge corresponding essentially to a latent positive image. This image can then be conveniently developed to form a visible positive image by contacting with oppositely charged pigmented particles, commonly identified as toner particles, which will adhere mostly to the charged areas. The resulting image may optionally be permanently affixed to the photoconductor if the imaging layer is not to be reused. This usually occurs with binder-type photoconductive films where the photoconductive imaging layer is also an integral part of the finished copy.

Where "plain paper" copying systems are involved, however, the latent image is conveniently developed on the imaging surface of a reusable photoconductor, or transferred to another surface such as a sheet of paper, and thereafter developed. After a latent image is developed on the imaging surface of a reusabletype photoconductor, it is transferred to another substrate and then permanently affixed by using any one of a variety of well-known techniques such as by overcoating with a transparent film, or by thermal fusion of the toner particles to the sheet. In such a copying system the materials in the photoconductive layer must be capable of rapidly changing from an insulative, to a charge-conductive, and then back to an insulative condition to permit cyclic use of the imaging surface. Failure to revert back to the insulative state before each succeeding charging sequence will result in a high dark decay rate commonly referred to as "fatigue". In the past, the problem has been controlled, to some extent, simply by selection of those photoconductive materials having the best known rapid switching capacity. Typical of such materials are anthracene, poly(N-vinylcarbazole), sulfur, selenium, selenium alloys, metal-free phthalocyanines, etc., and mixtures thereof (U.S. Pat. No. 2,297,691).

While organic photoconductive materials such as poly(N-vinylcarbazole) generally have good dark decay characteristics, they generally lack sufficient inherent photosensitivity to be completely competitive with selenium. For this reason, they are usually used together with "activators". Poly(vinylcarbazoles), for example, are sensitized with 2,4,7-trinitro-9-fluorenone to obtain improved photoresponse, discharge characteristics, and even some improvement in dark decay characteristics (ref. U.S. Pat. No. 3,484,237). There are also other organic resins which are traditionally considered non-photoconductive, but which can be sensitized with Lewis Acids to form charge-transfer complexes which are photoresponsive at the visible end of the spectrum. U.S. Pat. Nos. 3,408,181; 3,408,182; 3,408,183; 3,408,184; 3,408,185; 3,408,186; 3,408,187; 3,408,188; 3,408,189; and 3,408,190 are of interest in this area.

For all practical purposes, the amount of sensitization of both photoconductive and non-photoconductive resins depends upon the concentration of the activator; within limits, the higher the loading, the greater the photoresponse obtained. Unfortunately however, loadings exceeding about 10 weight percent of the photoconductive composition will usually impair mechanical and/or photoconductive properties of the sensitized composition. Excessive amounts of activator in either a photoconductive or a nonphotoconductive material of the type disclosed in the above patents will tend to crystallize out of the photoconductive composition.

The above inherent limitations make it very difficult and often times impossible to obtain the much-desired marriage of a high quantum efficiency photoconductor with a tough, transparent, flexible, active matrix material having a low injection threshold.

One very useful discovery in this area utilizes various protective polymeric overcoats capable of holding a charge of high field strength on an external surface and also permitting selective transmittal of carriers from a photoconductive layer through the polymeric overcoat.

None of the known active matrix materials, however, are capable of satisfying all of the important physical and electronic properties needed for modern xerographic or electrophotographic usage.

OBJECTS OF THE INVENTION

It is an object of the present invention to obtain a new class of polymeric materials having the necessary physical and electrical properties to permit a wider and more flexible use of xerographic principles for copying purposes.

It is a further object to synthesize and utilize a new class of intrinsic organic photoconductors which can be combined with a substantial functional amount of an activator without unduly affecting its mechanical or photoconductive properties.

A further object of the present invention is to discover and synthesize a new active polymeric matrix material which is compatible with high quantum efficiency photoconductor material and which retains its flexability and durability.

SUMMARY OF THE INVENTION

These and other objects are realized by the discovery, preparation and utilization of a new class of aromatic polyvinyl polymers and elements utilizing such polymeric material conveniently represented by the formula:

(I)

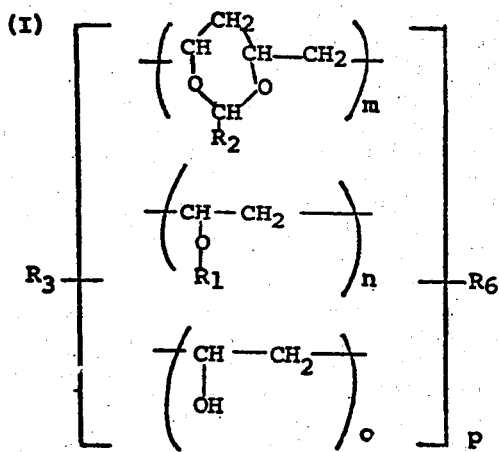

wherein $R_2$ is defined as an aromatic polycyclic substituent group having 4–5 fused ring nuclei, particularly a pyrene or other radical of the formulae (II)

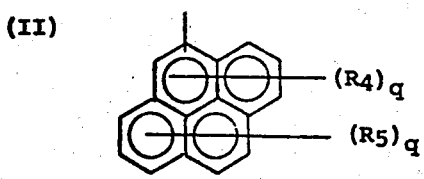

(III)

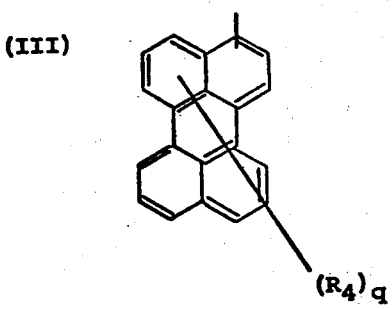

or defined as a N- or S-containing heterocyclic group, including a 3 ringed N-containing heterocyclic group of the formula (IV)

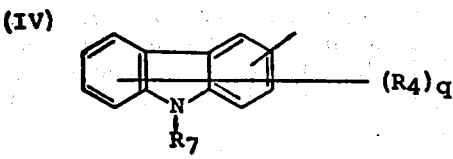

in which $R_4$ and $R_5$ are individually defined at each occurence as a lower alkyl group of 1–8 carbon atoms; a lower alkoxy of 1–8 carbon atoms, a halo group such as chloro and bromo an amino group including N, N, disubstituted lower alkyl amino groups, and a cyano group, such groups being preferably attached to one or more of the aromatic rings of the ring systems of formula (II)-(IV); $R_7$ is a lower alkyl exemplified as an alkyl of 1–8 carbons such as octyl; $q$ is defined as 0–2 and preferably 0–1.

$R_3$ of formula I is defined as a polymeric end group including the residue of an initiating chain or otherwise defined as a hydroxyl or ester group such as an alkyl carbonyl or an aryl carbonyl group in which the alkyl moiety usefully contains 1–18 carbon atoms and the aryl moiety is a phenyl group such as phenyl, hydroxy phenyl, an alkyl phenyl or a halo phenyl group:

$R_1$ is defined as a hydrogen atom, a lower alkyl group, including alkyl groups of 1–8 carbon atoms such as methyl, propyl, isopropyl and n-octyl, and preferably as an acyl group such as a lower alkyl carbonyl including $C_2H_5CO-$ and $CH_3-CO-$;

$R_6$ is a polymeric end group, including hydrogen or an acyl group such as an alkyl carbonyl having an alkyl moeity of 1–18 carbon atoms and an aryl carbonyl such as a phenyl carbonyl exemplified by phenylcarbonyl, alkyl substituted phenylcarbonyl or halophenylcarbonyl; and m, n, o and p are positive number commensurate with a number average molecular weight of at least about 5,000, conveniently varying from about 5,000 – 300,000 or higher and preferably greater than about 10,000; m, n and o falling within the respective ratios of about 1–6:0–1:1–8 in random or block polymers, and p being defined commensurate with the above molecular weights. For purposes of the present invention a preferred, although non-exclusive number average molecular weight extends from 10,000 to 300,000 depending upon the ratio of monomeric units and the definitions of $R_1$ and $R_2$. The preferred ratio of m:n:o is about 3–6:0–1:1–8.

Suitable monomeric components and ratios thereof which are includible within the present invention are set forth in Table I below with respect to formula I.

(I)

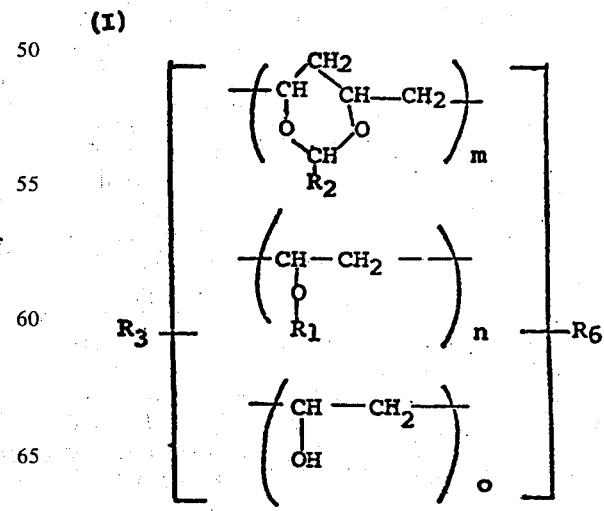

TABLE I

| No. | Approximate Number Average MW | $R_1$ | $R_2$ | $R_3$ | $R_4$ | $R_5$ | $R_6$ | Ratio m:n:o |
|---|---|---|---|---|---|---|---|---|
| P-1 | 12,000 | $CH_3$—CO— | 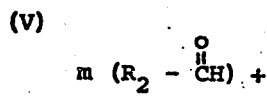 | OH | H | H | —$OCH_3$ | 5:1:3 |
| P-2 | 10,000 | — | " | " | $CH_3$— | $CH_3$— | " | 6:0:1 |
| P-3 | 36,000 | $CH_3$—CO— | " | " | H | H | " | 4:1:4 |
| P-4 | 50,000 | " | " | " | " | —Cl— | " | 4:1:6 |
| P-5 | 250,000 | " | " | " | " | $C_3H_7$— | " | 4:1:8 |
| P-6 | 1,000,000 | " | " | " | H | $(CH_3)_2N$— | " | 3:1:8 |
| P-7 | 11,000 | $CH_3$—CO— | 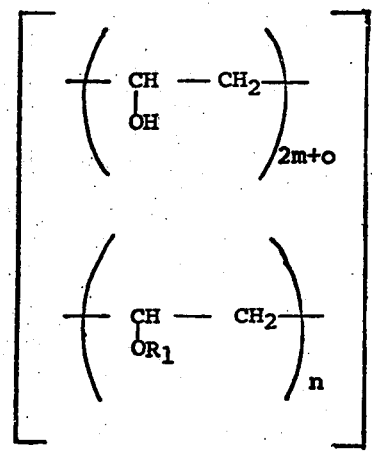 | OH | H | — | —$OCH_3$ | 6:1:6 |
| P-8 | 15,000 | " | " | " | " | — | —$OCH_3$ | 3:0:6 |
| P-9 | 20,000 | " | | " | H | — | " | 3:1:6 |
| P-10 | 50,000 | " | " | " | " | — | " | 3:0:8 |

Polymers or terpolymers within the scope of the present invention can be conveniently synthesized, for instance, by reacting the carboxyaldehyde of the desired polycyclic group with a homopolymer or a copolymer in accordance with the following general reaction mechanism, in which the radicals are defined as in formulae I–IV supra:

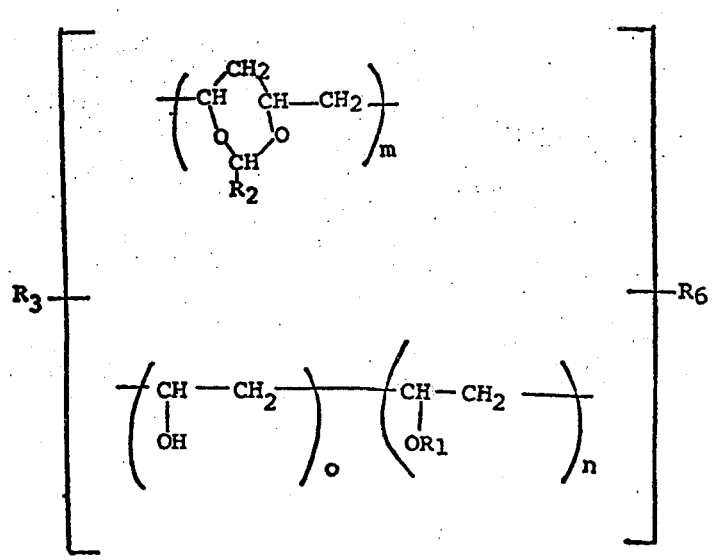

The desired product can also include, for instance, the reaction of a completely hydrolyzed poly(vinylacetate) in accordance with the following formulae:

(VIII)     (X)

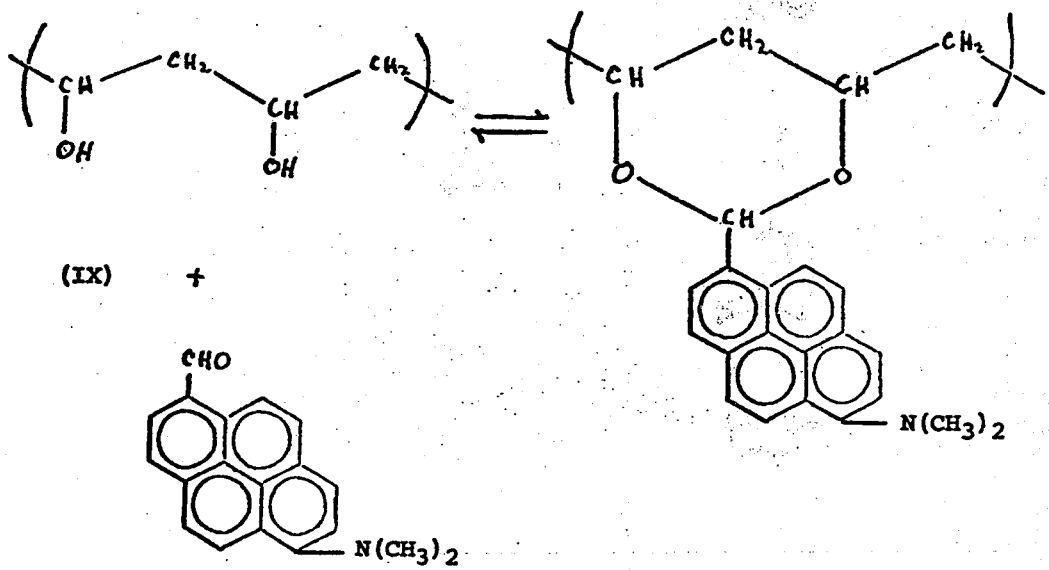

(IX) +

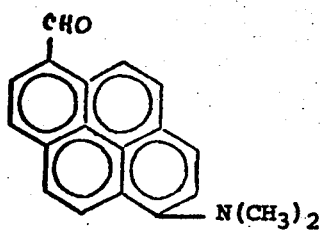

The above reaction best proceeds in a solvent having a high hydrogen bonding capability such as alcohols and water, dimethyl sulfoxide, or hexamethylphosphoramide.

Preformed polymeric reactants such as the poly(vinyl alcohol) of formula IV can be conveniently obtained from commercial sources, the aldehyde reactants being synthesized, for instance, by reacting pure pyrene with $POCl_3$, N-methyl formanilide and o-dichlorobenzene in accordance with the Vilsmeier reaction.*

* Bulletin of the Chemical Society of Japan, Vol. 41, 2719-22, 1968.

Synthesis of various aldehyde precursors can be effected as follows wherein $R_2$ is defined as above:

A. $R_2H \rightarrow R_2NO_2 \xrightarrow[P+]{[H]} R_2 - NH_2 \rightarrow R_2 - N(CH_3)_2$

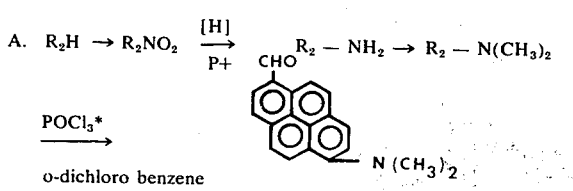

$\xrightarrow[\text{o-dichloro benzene}]{POCl_3*}$

B. $R_2H \xrightarrow[\phi-Cl_2]{POCl_3} R_2CHO \xrightarrow{[H]} \xrightarrow{Ni**} R_2-CH_3$

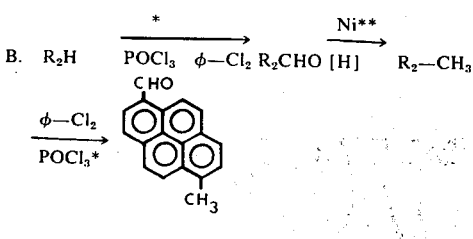

C. $R_2OH \rightarrow R_2-OR \xrightarrow[POCl_3*]{\phi-Cl_2}$

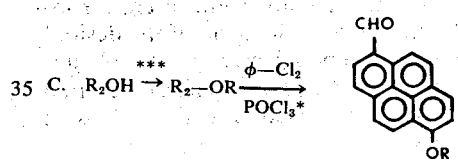

* Vilsmeier Reaction (see page 9)
** Chemical Abstracts, Vol. 50, 12008
*** Chemical Abstracts, Vol. 56, 1407–1408

The following Examples further illustrate certain preferred embodiments of the invention.

EXAMPLE I (P-3)

0.012 Mole of 1-pyrenecarboxyaldehyde obtained by the Vilsmeier reaction is slowly added, with agitation, to a vinylacetate/vinylalcohol copolymer (1:6) containing 0.012 molar equivalents of (—OH) functional groups in dimethyl sulfoxide. The reaction is allowed to proceed in the presence of about 0.25 gm. of toluene sulfonic acid for about 4 hours at about 110°C., and the resulting terpolymer product is recovered by precipitation from cold acetone. The product is found soluble in THF and $CHCl_2CHCl_2$, and conveniently cast from a THF-Tetrachloroethane solution to obtain a clear, hard, tough flexible film. The product, identified as P-3, is tested and reported in Tables I-III, and exhibits the following characteristics:

IR: 3550 (OH), 1740 (C=O), 847($\pi$)cm$^{-1}$
UV: $\lambda$max 328,343 nm
Solubility: THF, $CHCl_2CHCl_2$
MW: 36,000
Analysis (% pyrene by weight) 58.1%

EXAMPLE II (P-2)

0.12 Mole of 6, 9-dimethyl-pyrene-1 carboxaldehyde obtained by the Vilsmeier reaction is admixed with at least 99% hydrolyzed poly(vinylacetate) containing 0.26 molar equivalents of (—OH) functional groups dissolved in dimethyl sulfoxide, and the reaction is allowed to proceed at about 110°C. with agitation for about 3 hours. The resulting copolymeric product is recovered, identified as P-2, and tested as in Example I. The results are reported in Tables I-III.

EXAMPLE III (P-5)

0.040 Mole of 6-propyl-pyrene-1 carboxaldehyde is admixed with vinylacetate/vinyl alcohol (1:10 copolymer) containing 0.04 molar equivalents of (—OH) functional groups dissolved in dimethylformamide and allowed to react with agitation for 8 hours at about 120°C. The resulting terpolymer product is recovered, identified as P-5, and tested as in Example I. The results are reported in Tables I-III.

EXAMPLE IV (P-6)

Example II is repeated with 0.02 Mole of 6-dimethylamino-pyrene-1-carboxyaldehyde and vinylacetate/vinyl alcohol copolymer (1:10) containing a 0.02 molar equivalent of (—OH) functional group is dissolved in a 50:50 mixture of dimethylsulfoxide and hexamethylphosphoramide. The reaction is allowed to proceed at about 130°C. for 10 hours and the resulting terpolymer is recovered and identified as P-6. This compound is tested, as in Example I, and reported in Tables I-III.

TABLE II

| Code | Polymer | Hardness** | Flexibility** | Clarity** |
|---|---|---|---|---|
| P-2 | Cop.* | vg | vg | vg |
| P-3 | Ter.* | vg | vg | ex |
| P-5 | Ter. | vg | ex | vg |
| P-6 | Ter. | ex | ex | vg |

*Cop. = Copolymer
Ter. = Terpolymer
** g = good
vg = very good
ex = excellent

EXAMPLE V

Twelve test photoreceptor strips identified respectively as T 1-8 and as controls C 1-4 are prepared in the usual manner by vapor condensation of a 6 μ selenium alloy (under vacuum) onto an aluminum foil substrate. A polymeric overcoat is cast onto the selenium layer from a 50:50 THF-Tetrachloroethane solution of the polymers of Examples I and II. The test strips are then dried, and tested in the usual way for electronic properties. The control strips C 1-4 are identically prepared but utilize a vinyl acetate/PVA copolymer (1:4) overcoat having a number average molecular weight of about 40,000. The results are reported in Table III below.

TABLE III

| No. | Polymer | Overcoat μ | Surface Potential (volt.) | PC Discharge ($v/sec^{-1}$* t=0) | Residual (after 15 sec) | Dark Decay ($v/sec^{-1}$) |
|---|---|---|---|---|---|---|
| T-1 | P-2 | 9 | (+)810 | (+)410 | 110v | 30 |
| T-2 | P-2 | 9 | (—)945 | (—)350 | 90v | 35 |
| T-3 | P-2 | 21 | (+)1365 | (+)900 | 110v | 50 |
| T-4 | P-2 | 21 | (—)1323 | (—)600 | 100v | 60 |
| T-5 | P-3 | 9 | (+)810 | (+)360 | 100v | 25 |
| T-6 | P-3 | 9 | (—)945 | (—)207 | 100v | 14 |
| T-7 | P-3 | 21 | (+)1365 | (+)840 | 80v | 33 |
| T-8 | P-3 | 21 | (—)1323 | (—)504 | 120v | 33 |
| C-1 | PVAc/PVA (1:4) | 9 | (+)810 | ** | | |
| C-2 | (1:4) | 9 | (—)945 | ** | | |
| C-3 | (1:4) | 21 | (+)1365 | ** | | |
| C-4 | (1:4) | 21 | (—)1323 | ** | | |

* measured at $80v/\mu^{-1}$ 200 watt tungsten-iodine lamp at 15 cm
** negligible discharge

EXAMPLE VI

Six test strips identified respectively as T 9-12 and C 5-6 are prepared by applying onto an aluminized mylar substrate a photoconductive layer of about 14 μ thickness consisting of Polymer P-2 (Example I) and P-3, the control strips C 5-6 are prepared identically, but utilize the same polymer used in control C 1-4 of Example V. Surface charges are applied to each sample in the usual way and the initial rate of discharge noted when continuously exposed to white light from a 200 watt Tungsten-iodine lamp at a distance of 15 cm. The strips are tested as to discharge rate and flex, and reported in Table IV below.

TABLE IV

| Sample | Polymer | Surface Potential (Volt) | Discharge Rate $v/sec^{-1}$ t 20 | Adhesion* |
|---|---|---|---|---|
| T-9 | P-3 | (+)810 | 150 | vg |
| T-10 | P-3 | (—)945 | 110 | vg |
| T-11 | P-2 | (+)810 | 175 | g |
| T-12 | P-2 | (—)945 | 125 | g |
| C-5 | PVAc/PVA (1:4) | (+)810 | ** | vg |
| C-6 | (1:4) | (—)945 | ** | vg |

* vg = very good (no observable cracks or spalls after 3 bends over a 3" diameter pipe)
g = good (minor cracks observable with a low power microscope)
** negligable discharge While the invention has been particularly shown and described with reference to preferred embodiments thereof, it will be understood that variations in form may be made thereon without departing from the spirit and scope of the invention.

What is claimed is:

1. An aromatic polyvinyl polymer represented by the formula

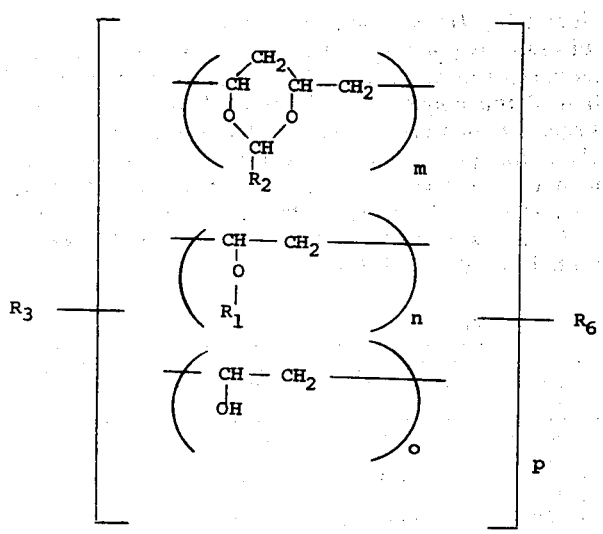

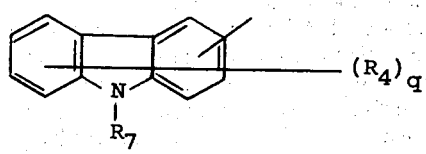

wherein
R₁ is defined as a hydrogen atom, a lower alkyl group or as a lower alkyl carbonyl group;
R₂ is an aromatic polycyclic radical having 4–5 fused ring nuclei or a 3 ringed N-containing heterocyclic group of the formula

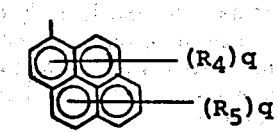

in which $R_4$ is individually defined at each occurrence as a lower alkyl group, a lower alkoxy group, a halo group, an amino group or a cyano group, $R_7$ is a lower alkyl group and $q$ is defined as 0–2;
$R_3$ and $R_6$ are polymeric end groups; and
$m$, $n$, $o$ and $p$ are positive numbers commensurate with a number average molecular weight of at least about 5,000; $m$, $n$ and $o$ falling with the respective ratios of about 1–6:0–1:1–8 in random or block polymers.

2. An aromatic polyvinyl polymer of claim 1 wherein $R_1$ is defined as hydrogen or a lower alkyl carbonyl group; and
$R_2$ is a pyrene group of the formula

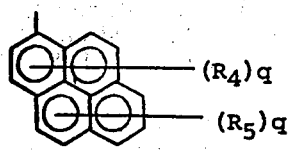

wherein
$R_4$ and $R_5$ are individually defined as a lower alkyl, a halo or a cyano group; and $q$ is defined as 0–2;
the polymer having a number average molecular weight of about 5,000 to 300,000.

3. An aromatic polyvinyl polymer of claim 1 wherein $R_1$ is hydrogen, or a lower alkyl carbonyl group;
$R_2$ is a radical of the formulae

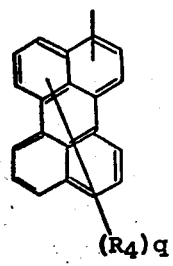 or

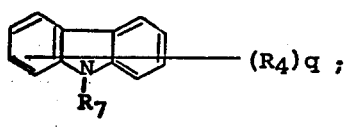

and wherein $R_4$ is individually defined at each occurrence as a lower alkyl group, a halo group or a cyano group, and $q$ is defined as 0–2; and $R_7$ is a lower alkyl group, the polymer having a number average molecular weight greater than about 10,000.

4. An aromatic polyvinyl polymer of claim 2 wherein $n$ is defined as zero.

5. An aromatic polyvinyl polymer of claim 3 wherein $n$ is defined as zero.

6. An aromatic polyvinyl polymer of claim 2 wherein $R_1$ is a hydrogen atom or $CH_3CO-$;
$n$ is defined as 0 or 1; and
$R_2$ is defined as a radical of the formula

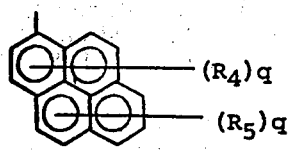

in which $R_4$ and $R_5$ are individually defined at each occurrence as hydrogen, lower alkyl, halo, or cyano groups, and $q$ is 0–2.

7. An aromatic polyvinyl polymer of claim 2 wherein the ratio of m:n:o is about 3–6:0–1:1–8 $m$, $n$, $o$ and $p$ being defined as positive integers commensurate with a molecular weight greater than about 12,000.

8. An aromatic polyvinyl polymer of claim 7 represented by the formula

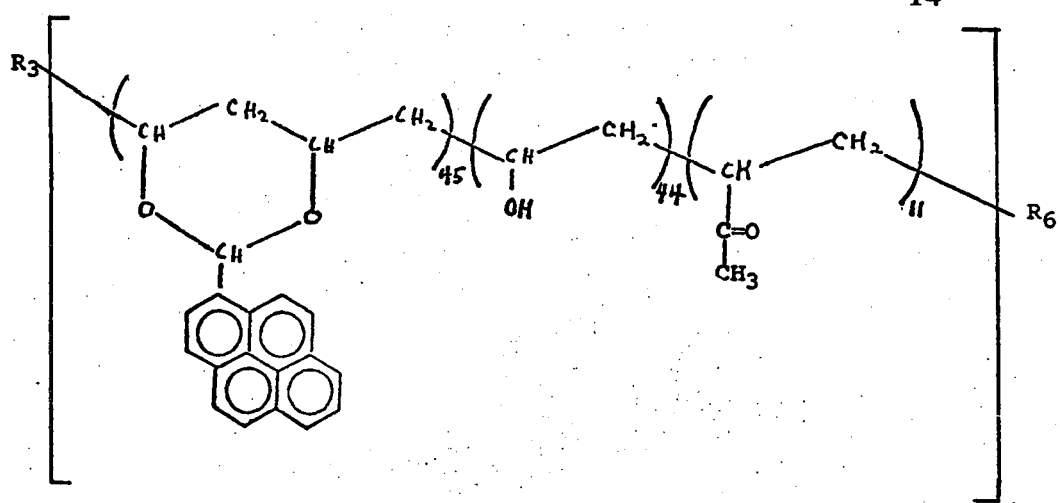
wherein the number average molecular weight is greater than about 10,000.
* * * * *

UNITED STATES PATENT AND TRADEMARK OFFICE
CERTIFICATE OF CORRECTION

PATENT NO. : 3,941,750
DATED : March 2, 1976
INVENTOR(S) : William W. Limburg

It is certified that error appears in the above-identified patent and that said Letters Patent are hereby corrected as shown below:

Column 1, line 40, delete "reusabletype" and insert --reusable-type--.

Column 2, line 57, delete "flexability" and insert --flexibility--.

Column 9, line 1, delete "carboxaldehyde" and insert --carboxyaldehyde--.

Column 9, line 33, delete "carboxaldehyde" and insert --carboxyaldehyde--.

Signed and Sealed this

Thirty-first Day of August 1976

[SEAL]

Attest:

RUTH C. MASON
Attesting Officer

C. MARSHALL DANN
Commissioner of Patents and Trademarks